(12) United States Patent
Kim et al.

(10) Patent No.: US 8,773,064 B2
(45) Date of Patent: Jul. 8, 2014

(54) REVERSE CHARGING PREVENTION SYSTEM FOR MILD HYBRID VEHICLE

(75) Inventors: Kwangyeon Kim, Gyeonggi-do (KR);
Jun Yong Lee, Gyeonggi-do (KR);
Chan-Ho Kang, Gyeonggi-do (KR);
Gyoung-Man Kim, Ulsan (KR);
Eun-Jin Jung, Gyeonggi-do (KR);
Hag-Wone Kim, Chungbuk (KR)

(73) Assignees: Hyundai Motor Company, Seoul (KR);
Egtronics Co., Ltd., Yongin, Gyeonggi-Do (KR)

( * ) Notice: Subject to any disclaimer, the term of this patent is extended or adjusted under 35 U.S.C. 154(b) by 365 days.

(21) Appl. No.: 13/227,886

(22) Filed: Sep. 8, 2011

(65) Prior Publication Data

US 2012/0139487 A1    Jun. 7, 2012

(30) Foreign Application Priority Data

Dec. 6, 2010    (KR) .................. 10-2010-0123826

(51) Int. Cl.
*H01M 10/46*    (2006.01)

(52) U.S. Cl.
USPC ................................................. 320/104

(58) Field of Classification Search
USPC .................... 320/104, 107, 109, 134, 136
See application file for complete search history.

(56) References Cited

U.S. PATENT DOCUMENTS

| | | | | |
|---|---|---|---|---|
| 2009/0309537 | A1* | 12/2009 | Saito | 320/101 |
| 2010/0315040 | A1* | 12/2010 | Sakurai | 320/109 |
| 2011/0148354 | A1* | 6/2011 | Wenger et al. | 320/109 |
| 2011/0309793 | A1* | 12/2011 | Mitsutani | 320/109 |
| 2012/0112702 | A1* | 5/2012 | Steigerwald et al. | 320/137 |

FOREIGN PATENT DOCUMENTS

| | | |
|---|---|---|
| KR | 10-2004-0009318 A | 1/2004 |
| KR | 10-2008-0079081 A | 8/2008 |
| KR | 10-0900281 B1 | 5/2009 |

* cited by examiner

*Primary Examiner* — Edward Tso
(74) *Attorney, Agent, or Firm* — Edwards Wildman Palmer LLP; Peter F. Corless (57) ABSTRACT

A charging system for a hybrid vehicle which prevents a super capacitor from being reverse charged. In the illustrative charging system a DC-DC converter is connected to the inverter and configured to receive the DC electricity from the inverter and drop voltage. A battery is configured to receive the DC electricity from the DC-DC converter and to be charged by the DC electricity. Finally, a means for preventing reverse charging is mounted on a path between the super capacitor and the battery and is configured to prevent energy from flowing from the battery to the super capacitor.

10 Claims, 12 Drawing Sheets

REVERSE CHARGING PREVENTION SYSTEM FOR MILD HYBRID VEHICLE

CROSS-REFERENCE TO RELATED APPLICATION

This application claims priority to and the benefit of Korean Patent Application No. 10-2010-0123826 filed in the Korean Intellectual Property Office on Dec. 6, 2010, the entire contents of which are incorporated herein by reference.

BACKGROUND OF THE INVENTION (a) Field of the Invention

The present invention relates to a charging system for a mild hybrid vehicle. More particularly, the present invention relates to a charging system for a mild hybrid vehicle which prevents a super capacitor from being reverse charged quickly by voltage of a battery in a case that a charging voltage of the super capacitor is lower than that of the battery.

(b) Description of the Related Art

Recently, environmentally-friendly vehicles such as hybrid vehicles and electric vehicles have attracted increased attention due to energy depletion and environmental pollution. Since hybrid vehicles have an engine as power source, hybrid vehicles do not need to charge a battery by using exterior commercial electricity. Since an electric vehicle, on the contrary, does not have the engine, the electric vehicle must charge the battery periodically by using exterior commercial electricity. In addition, the hybrid vehicle is largely classified into a mild hybrid vehicles and plug-in hybrid vehicle according to charging type. A mild hybrid vehicle charges the battery by using a portion of energy generated at an internal combustion engine, and plug-in hybrid vehicle is a hybrid vehicle that charges the battery by receiving energy from the exterior commercial electricity.

Figure 9:
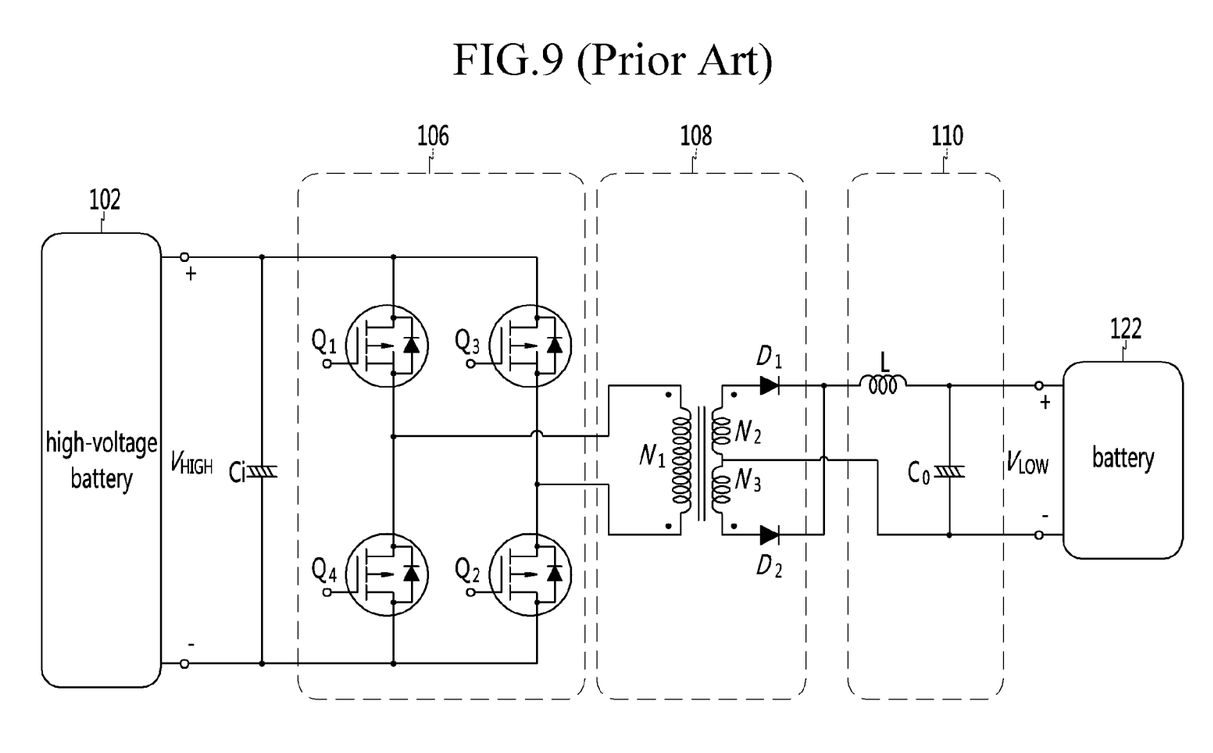
FIG. 9 is a schematic diagram of a conventional charging system using an insulated buck type DC-DC converter.

Since a pure electric vehicle and the plug-in hybrid vehicle receive the energy from exterior commercial electricity, there is a large difference between an input terminal voltage and an output terminal voltage. Therefore, an insulated buck type DC-DC converter using a transformer shown in FIG. 9 is typically used. As shown in FIG. 9, an input capacitor Ci is connected to a terminal of a high-voltage battery 102, an input of a switching element portion 106 having four switching elements Q1, Q2, Q3, and Q4 formed as full bridge is connected to the high-voltage battery 102, and an output of the switching element portion 106 is connected to a primary terminal of the transformer 108 in the insulated buck type DC-DC converter. A voltage of the high-voltage battery 102 is converted into an AC voltage by alternately turning on and off two pairs Q1-Q2 and Q3-Q4 of the switching element portion 106, and the AC voltage is dropped through the transformer 108 so as to apply a low voltage to a secondary coil. After that the low voltage applied to the secondary coil of the transformer 108 is rectified, the rectified voltage is smoothed through an inductor L and a capacitor Co and a DC voltage is charged in a battery 104. A duty ratio D for controlling the insulated buck type DC-DC converter is as follows.

$$D = \frac{V_{LOW}}{2 \times V_{HIGH}} \times \frac{N_2}{N_2}$$

Herein, $V_{HIGH}$ is the voltage of the high-voltage battery 102, $V_{LOW}$ is a voltage of the battery 104, $N_1$ is a winding number of a primary coil, and $N_2$ is a winding number of the secondary coil.

Since the transformer is used in the insulated buck type DC-DC converter, efficiency is reduced due to core loss but a high-voltage side and a low-voltage side are electrically insulated. In addition, if a voltage of an output terminal is higher than that of an input terminal, reverse charging does not occur.

Figure 10:
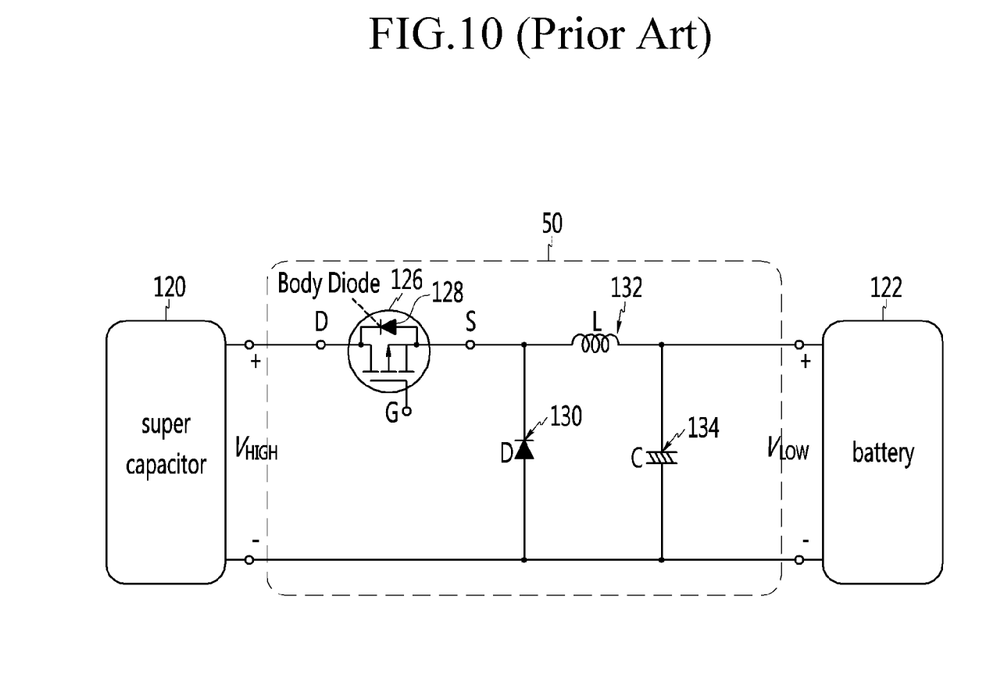
FIG. 10 is a schematic diagram of a conventional charging system using a non-insulated buck type DC-DC converter.

Because the difference between an input terminal voltage and an output terminal voltage of a charging system is small in the mild hybrid vehicle, a non-insulated buck type DC-DC converter shown in FIG. 10 is used instead of using the insulated buck type DC-DC converter which includes the transformer.

As shown in FIG. 10, the non-insulated buck type DC-DC converter 50 is disposed between a super capacitor 120 in which a voltage generated by the engine is stored and a battery 122. The non-insulated buck type DC-DC converter 50 includes a switching element 126, an inductor 132, a capacitor 134, and a free-wheeling diode 130.

The non-insulated buck type DC-DC converter 50 calculates a duty ratio from a voltage $V_{HIGH}$ of the super capacitor 120 being an input and a voltage $V_{LOW}$ of the battery 122 so as to get a target output voltage, and duty-controls the switching element 126.

The duty-control means a method that fixes a switching frequency and controls turn-on ratio in a waveform of a period. The duty ratio D of the non-insulated buck type DC-DC converter 50 is as follows.

$$D = \frac{V_{LOW}}{V_{HIGH}}$$

Assuming that a minimum value of the duty ratio is represented as $D_{min}$, an equivalent impedance of loss is represented as $Z_L$, a frequency of the switching element 126 is represented as f, an output voltage is represented as $V_o$, a pulsating output voltage is represented as $\Delta V_o$, a minimum inductance $L_{min}$ of the inductor 132 and a minimum capacitance $C_{min}$ of the capacitor 134 used in the circuit are as follows.

$$L_{min} = \frac{(1 - D_{min})}{2f} \times Z_L$$

$$C_{min} = \frac{(1 - D_{min})}{8 \times L_{min} \times f^2} \times \frac{V_o}{\Delta V_o}$$

As known from an above equation, the inductance of the inductor 132 is inversely proportional to the switching frequency f and the capacitance of the capacitor 134 is inversely proportional to square of the switching frequency f. If the switching frequency f is long, the inductance of the inductor 132 and the capacitance of the capacitor 134 can decrease. Therefore, size of the converter can be reduced.

Figure 11:
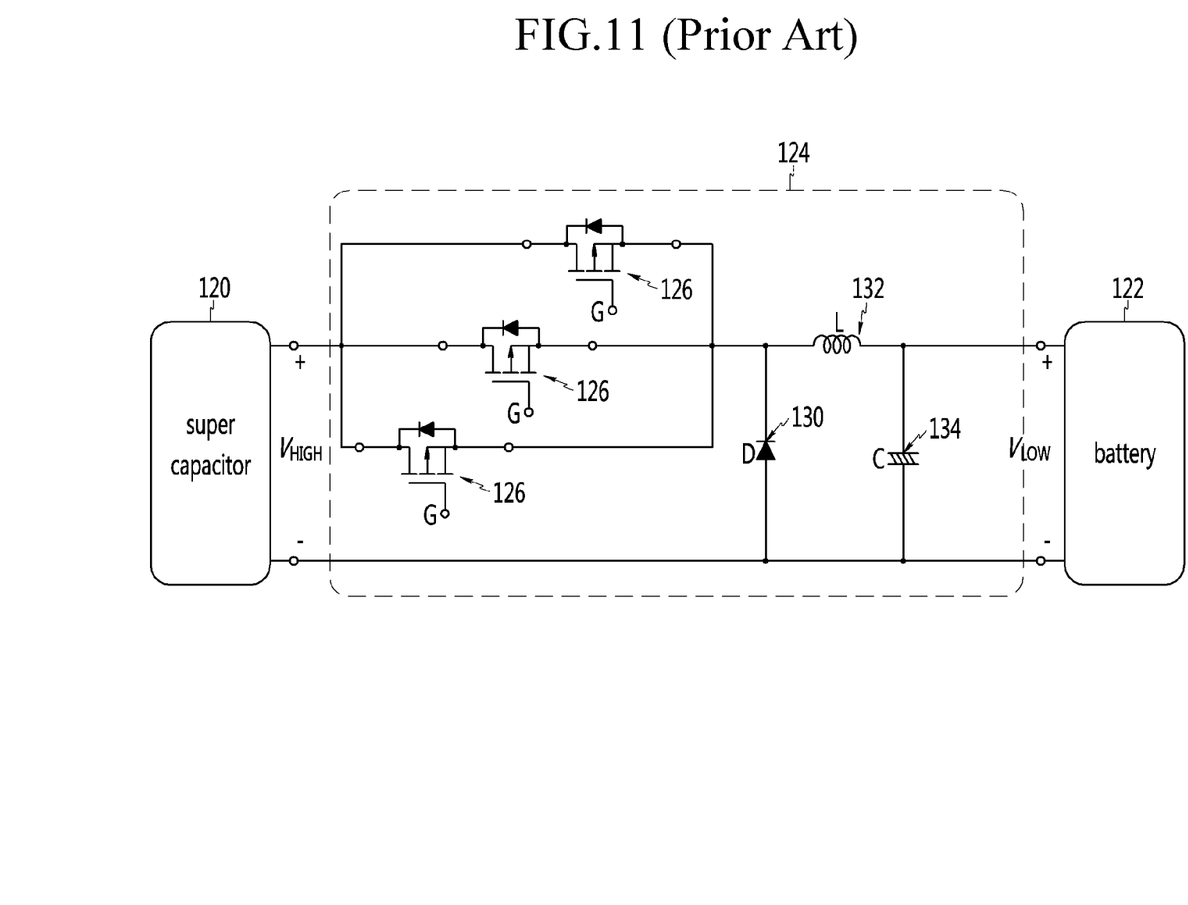
FIG. 11 is a schematic diagram of another conventional charging system using a non-insulated buck type DC-DC converter.

Because the switching frequency is made longer so as to manufacture a smaller DC-DC converter, a metal-oxide semiconductor field transistor (MOSFET) rather than an insulated gate bipolar transistor (IGBT) is widely used as the switching element. The MOSFET can be used in the circuit using high switching frequency, but is not suitable for use in the circuit using high voltage and high current. The voltage in the super capacitor is typically low (e.g., 15V-30V) but high current flows through the super capacitor in the DC-DC converter of the mild hybrid vehicle. Therefore, the circuit cannot be constructed by using only one MOSFET. Accordingly, more than two switching elements 126 are connected in parallel with each other so as to share current capacity as shown in FIG. 11.

The super capacitor 120 used in a charging system of the mild hybrid vehicle has a self-discharge circuit such that energy charged in the super capacitor 120 is discharged slowly. Since the discharged super capacitor 120 can be charged in a generating mode after the vehicle is started, the charging voltage of the super capacitor 120 becomes lowered gradually when the vehicle is not driven for a long period of time. If the charging voltage of the super capacitor 120 falls below the voltage of the battery 122, the energy charged in the battery 122 is reverse charged to the super capacitor 120 through a body diode 128 mounted at the switching element 126 of the non-insulated buck type DC-DC converter 124.

Figure 12:
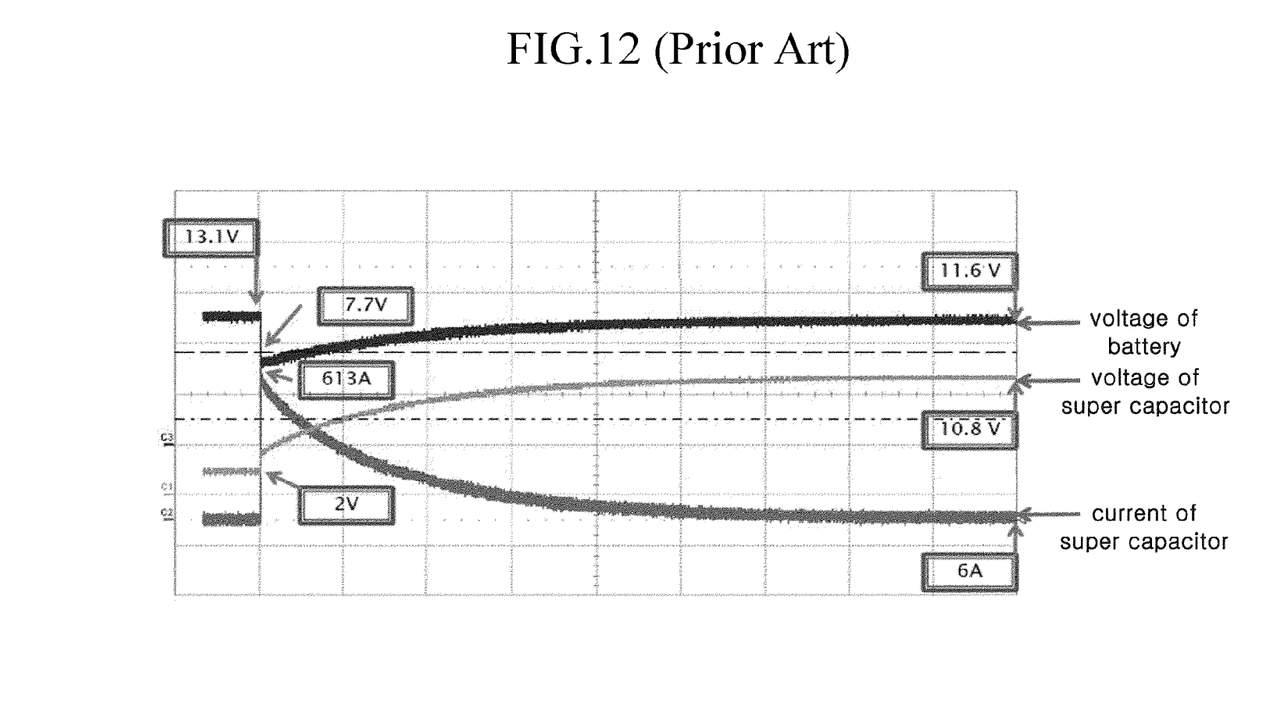
FIG. 12 is a graph illustrating a battery voltage, a voltage of a super capacitor, and a current of the super capacitor in a conventional charging system using a non-insulated buck type DC-DC converter in a case that reverse charging occurs.

Particularly, when a power system of the mild hybrid vehicle is assembled initially, the charging voltage of the super capacitor 120 is the lowest voltage (e.g., 3V) and difference between the charging voltage of the super capacitor 120 and the voltage of the battery 122 is the largest. Therefore, when assembling the power system initially, high current flows occur. That is, if the discharged super capacitor is connected, the voltage of the battery is lowered and the charging voltage of the super capacitor becomes heightened as shown in FIG. 12.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a charging system for a mild hybrid vehicle having advantages of preventing a super capacitor from being reverse charged from a battery through a DC-DC converter due to discharge of the super capacitor in a non-insulated buck type DC-DC converter that charges energy in the super capacitor by using the battery.

A charging system for a mild hybrid vehicle according to an exemplary embodiment of the present invention may include: an engine; an integrated starter and generator (ISG) connected to the engine and configured to generate 3-phase AC electricity and/or to start the engine. An inverter is configured to convert the 3-phase AC electricity generated at the ISG into DC electricity and/or convert the DC electricity into the 3-phase AC electricity and to deliver the 3-phase AC electricity to the ISG. A super capacitor is configured to receive the DC electricity from the inverter and be charged by the DC electricity, and may alternatively deliver the charged DC electricity to the inverter. Further, a DC-DC converter is connected to the inverter and configured to receive the DC electricity from the inverter and drop voltage, accordingly. A battery is configured to receive the DC electricity from the DC-DC converter and be charged by the DC electricity. Additionally, the present invention also includes a means for preventing reverse charging which is mounted on a path between the super capacitor and the battery and which is configured to prevent energy from flowing from the battery to the super capacitor.

According to the first exemplary embodiment of the present invention, the DC-DC converter may include a switching element configured to interrupt a circuit. In this case, the means for preventing reverse charging is the switching element in which a body diode is removed. Alternatively in a second exemplary embodiment of the present invention, the means for preventing reverse charging may be a circuit interruption transistor. The circuit interruption transistor may be an IGBT or a power transistor without a body diode. Even further, the means for preventing reverse charging may be a relay.

According to a fourth exemplary embodiment of the present invention, the means for preventing reverse charging may be a diode forwardly biased from the super capacitor to the battery.

DETAILED DESCRIPTION OF THE EMBODIMENTS

Hereinafter, exemplary embodiments of the present invention will be described referring to accompanying drawings in order for a person having ordinary skill in the art to which said subject matter pertains to easily carry out the present invention.

Note that it is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

An exemplary embodiment of the present invention will hereinafter be described in detail with reference to the accompanying drawings.

Figure 1:
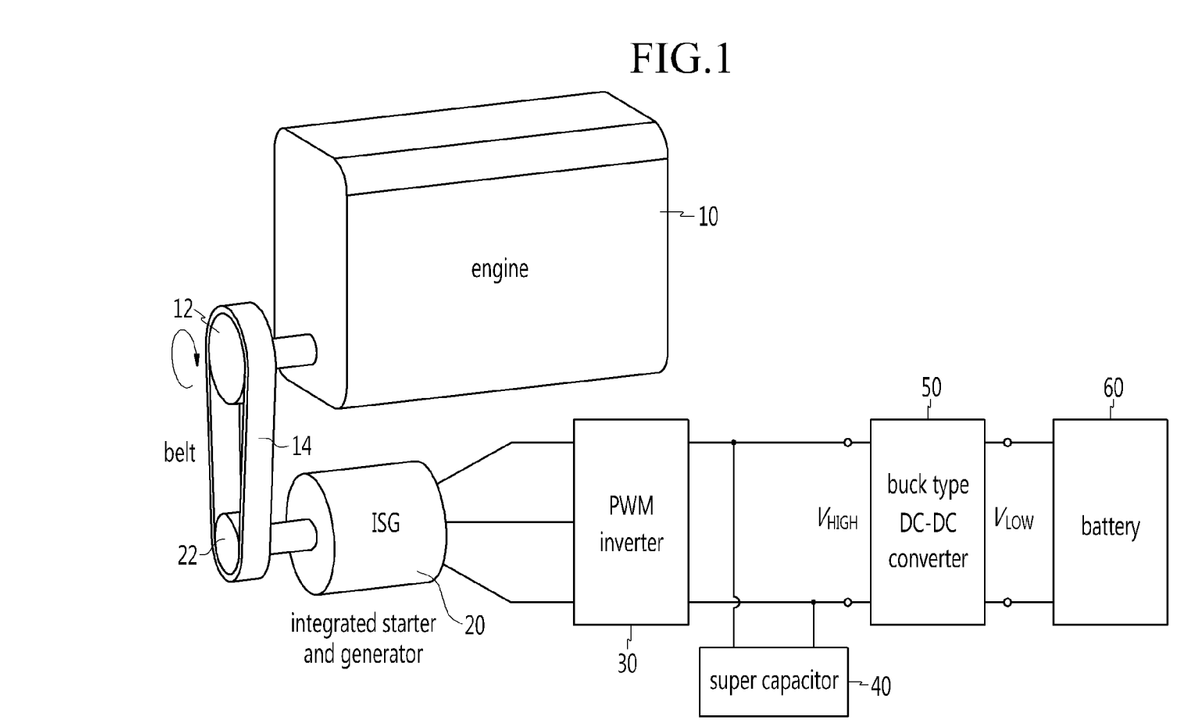
FIG. 1 is a schematic diagram of a charging system for a mild hybrid vehicle according to an exemplary embodiment of the present invention.
Figure 2:
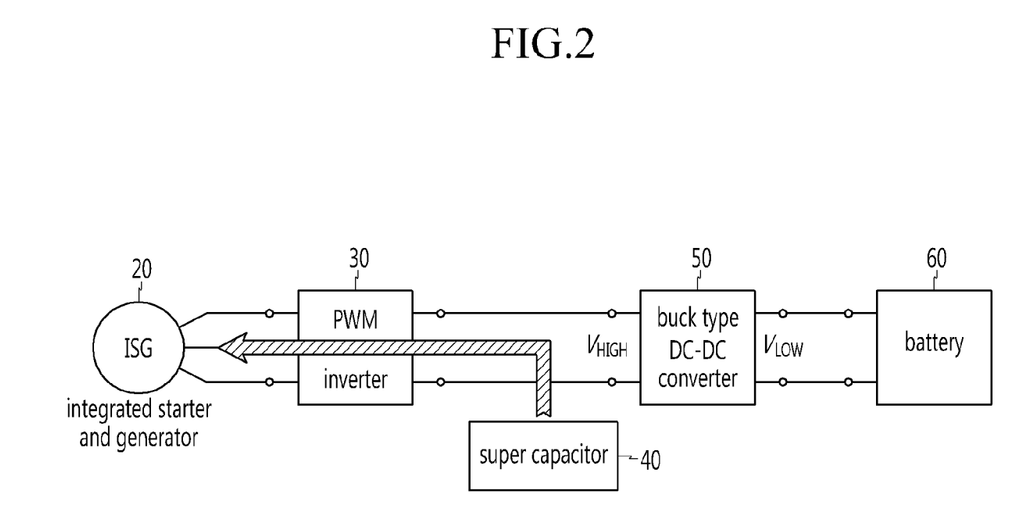
FIG. 2 is a schematic diagram illustrating energy flow at an engine starting in a charging system for a mild hybrid vehicle according to an exemplary embodiment of the present invention.

FIG. 1 is a schematic diagram of a charging system for a mild hybrid vehicle according to an exemplary embodiment of the present invention; FIG. 2 is a schematic diagram illustrating energy flow at an engine starting in a charging system for a mild hybrid vehicle according to an exemplary embodiment of the present invention; and FIG. 3 is a schematic diagram illustrating energy flow at a charge of a battery in a charging system for a mild hybrid vehicle according to an exemplary embodiment of the present invention.

Figure 3:
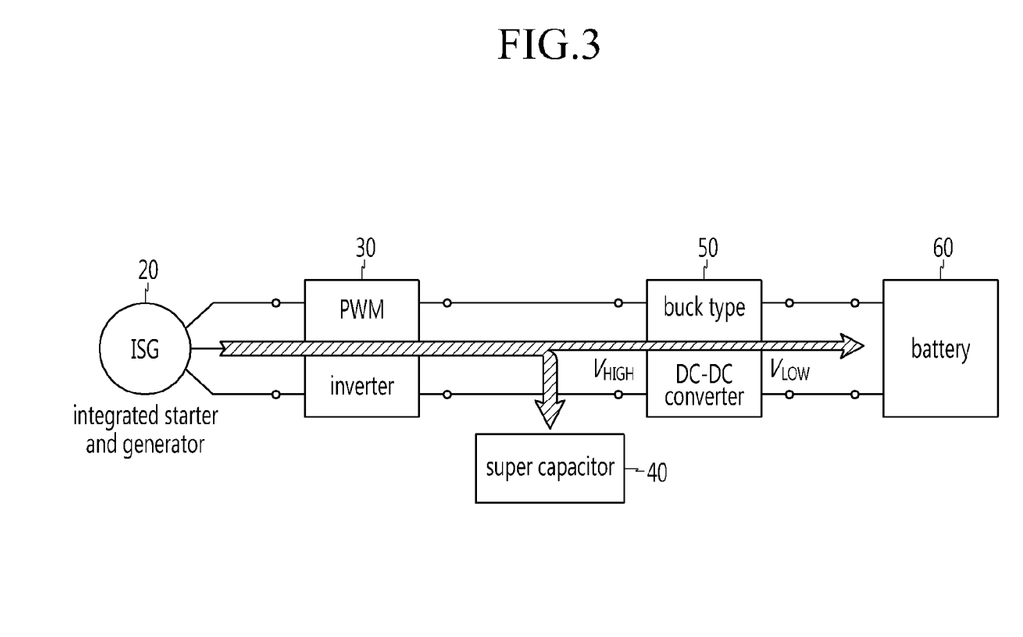
FIG. 3 is a schematic diagram illustrating energy flow at a charge of a battery in a charging system for a mild hybrid vehicle according to an exemplary embodiment of the present invention.

As shown in FIG. 1 to FIG. 3, a charging system for a mild hybrid vehicle according to an exemplary embodiment of the present invention includes an engine 10, an integrated starter and generator (ISG) 20, a PWM inverter 30, a super capacitor 40, a DC-DC converter 50, and a battery 60. The engine 10 may be any type of engine applicable to a vehicle, and for example, may be a diesel engine, a gasoline engine, or a liquid propane injection (LPI) engine. A main pulley 12 is mounted on a crankshaft of the engine 10 and rotates with the crankshaft.

The ISG 20 is connected to the engine 10 through a power delivery device. In this specification, a belt is exemplarily shown as the power delivery device, but is not limited to this. For this purpose, a sub pulley 22 is rotatably mounted at the ISG 20 and is operably coupled to the main pulley 12 through a belt 14. The ISG 20 is operated as a starting motor when the engine 10 is started and is operated as a generator when the engine 10 runs so as to charge the battery 60. The ISG 20 generates a 3-phase AC voltage.

The pulse width modulation (PWM) inverter 30 is electrically connected to the ISG 20 so as to receive the 3-phase AC voltage, and converts the 3-phase AC voltage into a DC voltage. In addition, the PWM inverter 30 converts the DC voltage stored in the super capacitor 40 into the 3-phase AC voltage and delivers the 3-phase AC voltage to the ISG 20 when the engine 10 is started.

A DC terminal of the PWM inverter 30 is simultaneously connected to the super capacitor 40 and the DC-DC converter 50. Therefore, the DC voltage is applied to the super capacitor 40 and the DC-DC converter 50 when the battery 60 is charged.

A non-insulated buck type DC-DC converter may be used as the DC-DC converter 50. One side terminal of the DC-DC converter 50 is electrically connected to the PWM inverter 30 such that a high voltage is applied thereto, and the other side terminal of the DC-DC converter 50 is electrically connected to the battery 60 such that a low voltage is formed.

When the mild hybrid vehicle is started, energy stored in the super capacitor 40 is delivered to the ISG 20 through the PWM inverter 30, as shown in FIG. 2. Then, the ISG 20 is operated as the starting motor and cranks the engine 10. At this time, the DC-DC converter 50 does not charge the battery 60. That is, DC-DC converter 50 and the PWM inverter 30 receive signal from an electric control unit (ECU) through CAN communication and prepare the operation for starting.

If the mild hybrid vehicle is driven by the engine 10, the ISG 20 generates electricity, as shown in FIG. 3. The 3-phase AC electricity generated at the ISG 20 is converted into the DC electricity by the PWM inverter 30. The converted DC electricity is charged in the super capacitor 40 and is simultaneously input to the DC-DC converter 50. The DC-DC converter 50 calculates a duty ratio of a control signal according to an input voltage $V_{HIGH}$ of DC-DC converter 50 and the voltage of the battery 60 and duty-controls a switching element in the DC-DC converter 50.

Main function of the switching element in the DC-DC converter 50 is turning-on or turning off a circuit according to the control signal. Types of switching elements are different in accordance with a control circuit, a voltage, a current capacity, and a switching frequency, but an MOSFET or an IGBT may be used as the switching element. If the switching element is turned-off and the circuit including an inductor is open, the current briefly becomes zero. Therefore, very high voltage is generated between both ends of the inductor. Since many elements including the inductor can be damaged due to the high voltage, a path for discharging energy inductor load should be secured even though the circuit is open by the switching element. For this purpose, the circuit in which a body diode is connected to both ends of the switching element is generally used. The switching element and body diode may be separately manufactured and then be assembled, but the body diode may be connected in parallel to the switching element when manufacturing the switching element.

As described above, the energy charged in the battery 60 can unfortunately be reverse charged to the super capacitor 40 by the body diode. The present invention, however, prevents the super capacitor 40 from being reverse charged according to an exemplary embodiment of the present invention.

Figure 4:
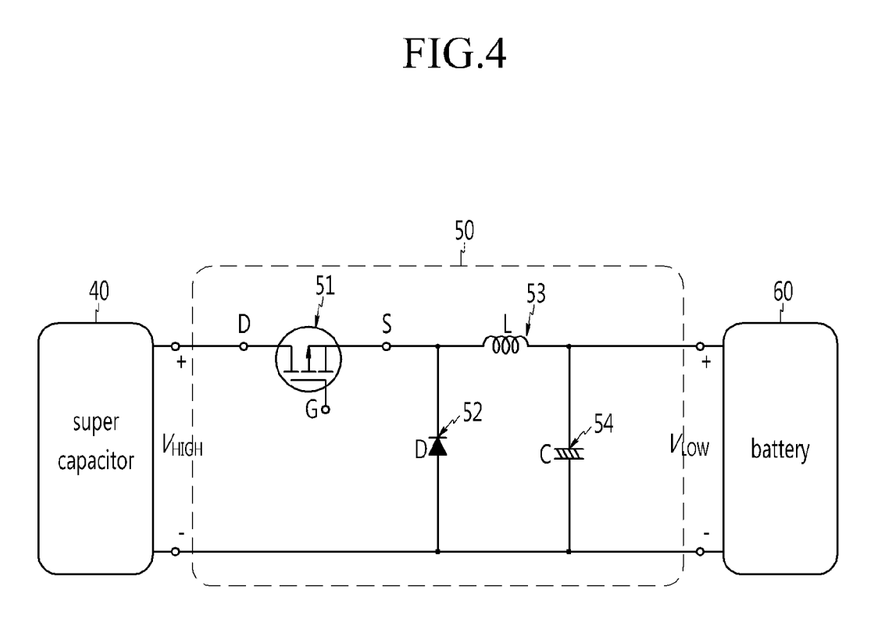
FIG. 4 illustrates a first exemplary embodiment of a non-insulated buck type DC-DC converter used in a charging system for a mild hybrid vehicle according to an exemplary embodiment of the present invention.

FIG. 4 illustrates a first exemplary embodiment of a non-insulated buck type DC-DC converter used in a charging system for a mild hybrid vehicle according to an exemplary embodiment of the present invention.

As shown in FIG. 4, the non-insulated buck type DC-DC converter 50 according to the first exemplary embodiment of the present invention may include a switching element 51, an inductor L 53, a capacitor C 54, and a free-wheeling diode 52. In the illustrative embodiment, the body diode is removed from the switching element 51. That is, the energy of the battery 60 is prevented from being delivered to the super capacitor 40 through the body diode. Therefore, the reverse charging of the super capacitor 40 may be prevented. Since the other constituent elements of the DC-DC converter 50 are well-known to a person of an ordinary skill in the art, detailed description thereof will be omitted in this specification.

Typically a switching element 51 (e.g., the MOSFET and the IGBT) includes a body diode. The body diode may be formed incidentally in manufacturing processes of the switching element 51, but can be removed on purpose in above the processes. Since the body diode connected to the both ends of the switching element 51 is the only element forming a forward path from the battery 60 to the super capacitor 40, the switching element 51 should be manufactured so that the body diode is not formed. If amount of impurities are controlled in the manufacturing processes, the body diode may be prevented from being formed or resistance of the body diode can be increased according to the MOSFET.

Compared to the MOSFET, the body diode can be easily removed according to the IGBT because removing process of the body diode is very simple. Since the switching frequency of the MOSFET is higher than that of the IGBT, the MOSFET is typically used in the circuit using high switching frequency.

Since MOSFETs typically cannot pass high current, MOSFETs are used in the circuit having a small current capacity compared with IGBTs. In order to increase current capacity, the MOSFETs are connected in parallel with each other. If the number of MOSFETs connected in parallel with each other increases, the number of paths through which the reverse charging occurs also increases. Therefore, if the MOSFET without the body diode is applied to the buck type DC-DC converter 50, the reverse charging from the battery 60 to the super capacitor 40 may be prevented.

The body diode in the IGBT can be removed easily compared to the MOSFET, but the switching frequency of the IGBT is lower than that of the MOSFET. Therefore, a smaller sized product cannot be manufactured. Since the DC-DC converter 50 used in the mild hybrid vehicle should be relatively small in size, the MOSFET using higher switching frequency should generally be used.

Figure 5:
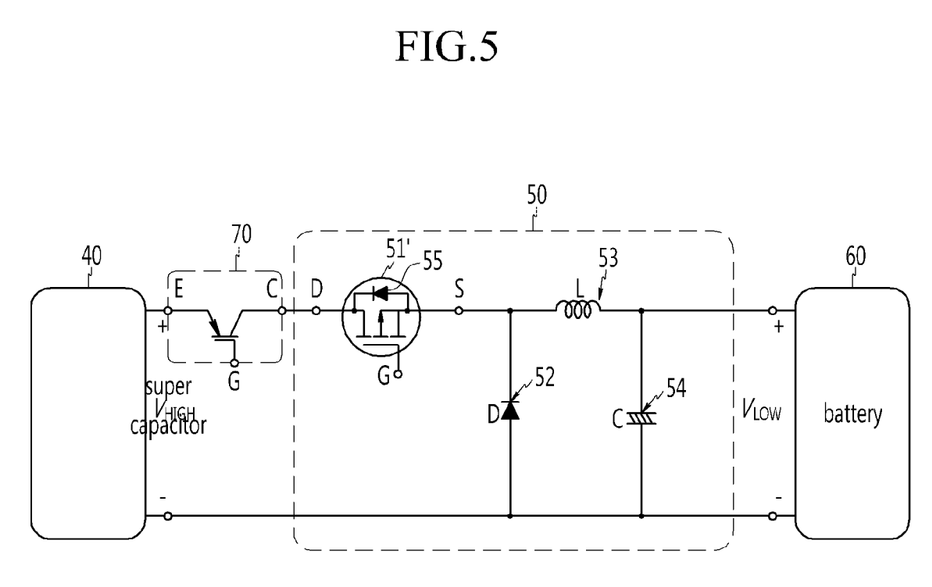
FIG. 5 illustrates a second exemplary embodiment of a non-insulated buck type DC-DC converter used in a charging system for a mild hybrid vehicle according to an exemplary embodiment of the present invention.

FIG. 5 illustrates a second exemplary embodiment of a non-insulated buck type DC-DC converter used in a charging system for a mild hybrid vehicle according to an exemplary embodiment of the present invention.

As shown in FIG. 5, the DC-DC converter 50 according to the second exemplary embodiment of the present invention uses a switching element 51' including the body diode 55. However, a circuit interruption transistor 70 without the body diode is installed between the super capacitor 40 and the DC-DC converter 50. The IGBT or a power transistor (Power BJT Transistor) without the body diode can be used as the circuit interruption transistor 70. In order to use the circuit interruption transistor 70, an electric control unit (ECU) detects the voltage of the super capacitor 40 and the voltage of the battery 60 and turns on the circuit interruption transistor 70 if the voltage of the battery 60 is higher than that of the super capacitor 40. Therefore, path though which energy is delivered from the battery 60 to the super capacitor 40 is cut off and the super capacitor 40 cannot be reverse-charged.

Figure 6:
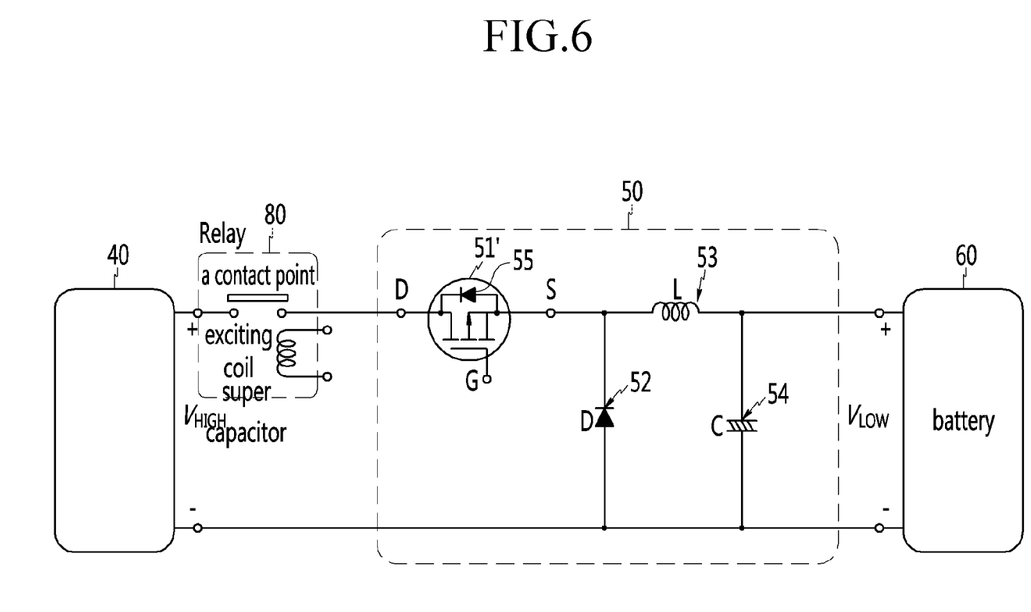
FIG. 6 illustrates a third exemplary embodiment of a non-insulated buck type DC-DC converter used in a charging system for a mild hybrid vehicle according to an exemplary embodiment of the present invention.

FIG. 6 illustrates a third exemplary embodiment of a non-insulated buck type DC-DC converter used in a charging system for a mild hybrid vehicle according to an exemplary embodiment of the present invention.

As shown in FIG. 6, the DC-DC converter 50 according to the third exemplary embodiment of the present invention uses the switching element 51' including the body diode 55. However, a relay 80 is installed between the super capacitor 40 and the DC-DC converter 50. In order to use the relay 80, the electric control unit (ECU) detects the voltage of the super capacitor 40 and the voltage of the battery 60, and turns off the relay 80 if the voltage of the battery 60 is higher than that of the super capacitor 40. Therefore, a path though which energy is delivered from the battery 60 to the super capacitor 40 is cut off and the super capacitor 40 cannot be reverse-charged.

Figure 7:
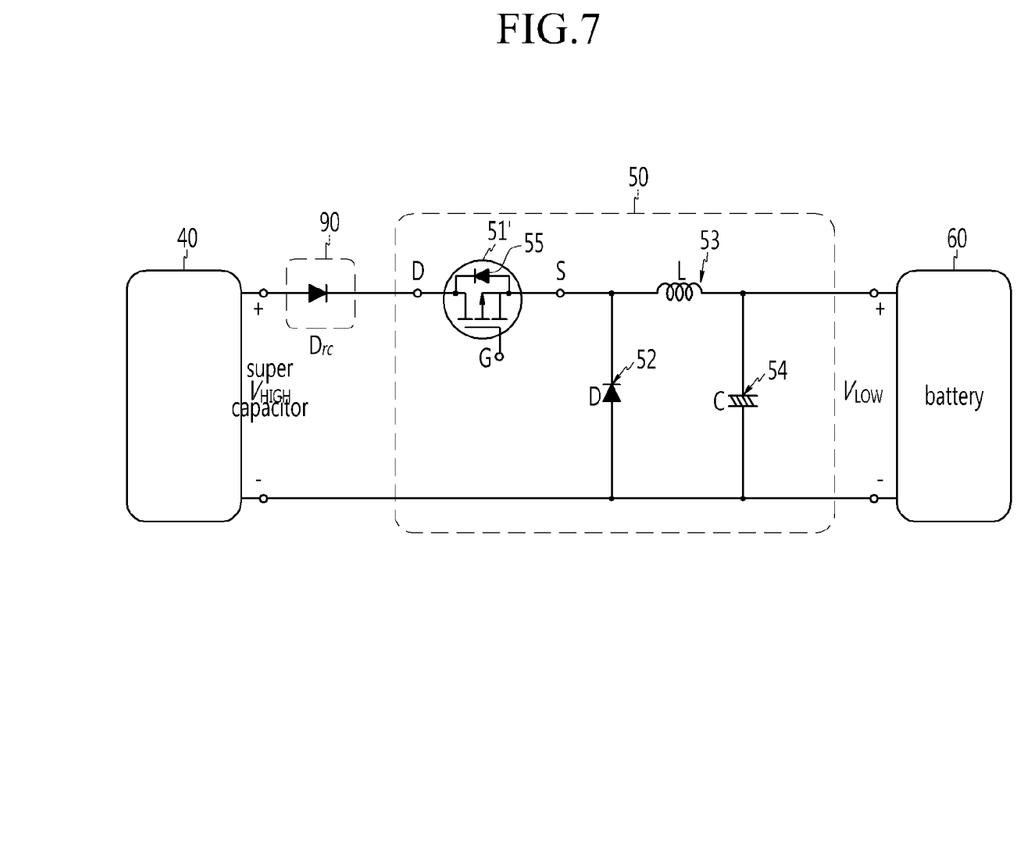
FIG. 7 illustrates a fourth exemplary embodiment of a non-insulated buck type DC-DC converter used in a charging system for a mild hybrid vehicle according to an exemplary embodiment of the present invention.

FIG. 7 illustrates a fourth exemplary embodiment of a non-insulated buck type DC-DC converter used in a charging system for a mild hybrid vehicle according to an exemplary embodiment of the present invention.

As shown in FIG. 7, the DC-DC converter 50 according to the fourth exemplary embodiment of the present invention uses the switching element 51' including the body diode 55. However, a diode 90 forwardly biased from the super capacitor 40 to the battery 60 is installed between the super capacitor 40 and the DC-DC converter 50. Current can flow from the super capacitor 40 to the battery 60, but cannot flow from the battery 60 to the super capacitor 40 due to the diode 90. Therefore, reverse charging of the super capacitor 40 can be prevented.

Figure 8:
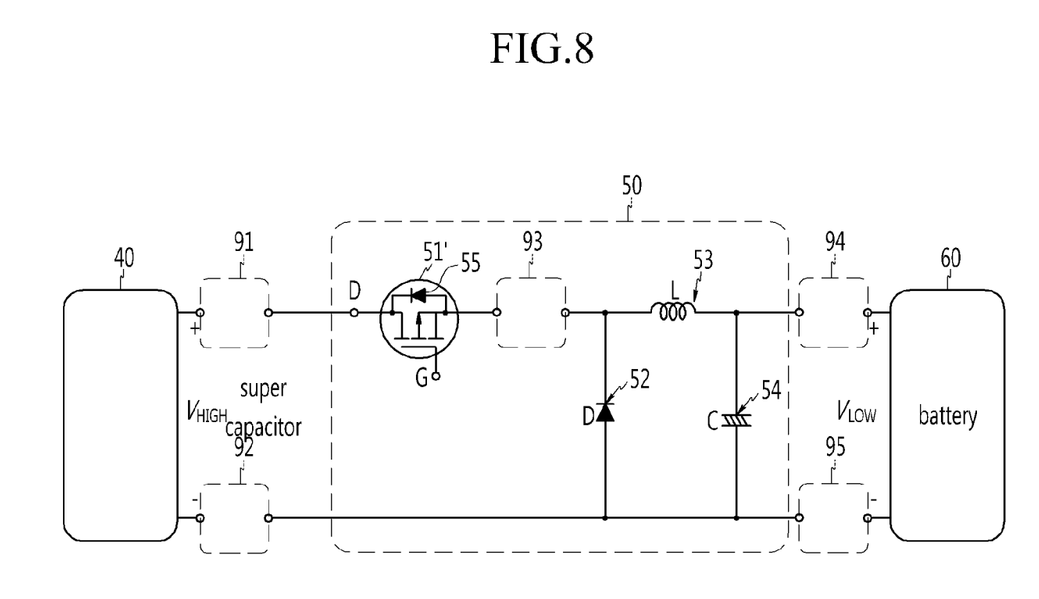
FIG. 8 is a schematic diagram illustrating a position at which means for preventing reverse charging are installed in a charging system for a mild hybrid vehicle according to an exemplary embodiment of the present invention.

FIG. 8 is a schematic diagram illustrating a position at which means for preventing reverse charging are installed in a charging system for a mild hybrid vehicle according to an exemplary embodiment of the present invention.

As shown in FIG. 8, means for preventing reverse charging (the switching element 51 without the body diode, the circuit interruption transistor 70, the relay 80, and the diode 90) can be installed at any position 91, 92, 93, 94, and 95 that connects the super capacitor 40 and the battery 60. For example, the means for preventing reverse charging can be installed at positions 91 and 92 between the super capacitor 40 and the DC-DC converter 50, at a position 93 in the DC-DC converter 50, or at positions 94 and 95 between the DC-DC converter 50 and the battery 60.

As described above, since paths forwardly bias from a battery to a to a super capacitor is removed by using a switching element without a body diode, the battery is prevented from being reverse-charged through the body diode of a DC-DC converter due to self-discharge of the super capacitor in a mild hybrid vehicle according to some embodiment of the present invention.

Since the switching element without the body diode is inserted in a series path between the super capacitor and the battery and the switching element is turned on or off by comparing the voltage of the super capacitor with that of the battery, reverse charging of the super capacitor can be prevented according to some embodiment of the present invention.

Since a relay is inserted in a series path between the super capacitor and the battery and the relay is turned on or off by comparing the voltage of the super capacitor with that of the battery, reverse charging of the super capacitor can be prevented according to some embodiment of the present invention.

Since a current-blocking diode is inserted in a series path between the super capacitor and the battery and the current-blocking diode is reversely biased if the voltage of the super capacitor decreases, reverse charging of the super capacitor can be prevented according to some embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A charging system for a mild hybrid vehicle, comprising:
   an engine;
   an integrated starter and generator (ISG) connected to the engine and configured to generate 3-phase AC electricity and to start the engine;
   an inverter configured to convert the 3-phase AC electricity generated at the ISG into DC electricity and configured to convert the DC electricity into the 3-phase AC electricity and to deliver the converted 3-phase AC electricity to the ISG;
   a super capacitor configured to receive the DC electricity from the inverter and be charged by the DC electricity, and to deliver the charged DC electricity to the inverter;
   a DC-DC converter connected to the inverter and configured to receive the DC electricity from the inverter and drop voltage;
   a battery configured to receive the DC electricity from the DC-DC converter and to be charged by the DC electricity; and
   means for preventing reverse charging mounted on a path between the super capacitor and the battery of the mild hybrid vehicle and configured to prevent energy from flowing from the battery to the super capacitor.

2. The charging system of claim 1, wherein the DC-DC converter comprises a switching element configured to interrupt a circuit.

3. The charging system of claim 1, wherein the means for preventing reverse charging is a circuit interruption transistor.

4. The charging system of claim 1, wherein the means for preventing reverse charging is a relay.

5. The charging system of claim 1, wherein the means for preventing reverse charging is a diode forwardly biased from the super capacitor to the battery.

6. A system for preventing reverse charging in a hybrid vehicle, comprising:
- a DC-DC converter connected to an inverter and configured to receive DC electricity from the inverter and drop voltage;
- a battery configured to receive the DC electricity from the DC-DC converter and to be charged by the DC electricity; and
- a device for preventing reverse charging mounted on a path between the super capacitor and the battery of the mild hybrid vehicle and configured to prevent energy from flowing from the battery to the super capacitor.

7. The charging system of claim 6, wherein the DC-DC converter comprises a switching element configured to interrupt a circuit.

8. The charging system of claim 6, wherein the device for preventing reverse charging is a circuit interruption transistor.

9. The charging system of claim 6, wherein the device for preventing reverse charging is a relay.

10. The charging system of claim 6, wherein the device for preventing reverse charging is a diode forwardly biased from the super capacitor to the battery.

\* \* \* \* \*